Inventors
Horace T. Thomas
Albert B. Hays

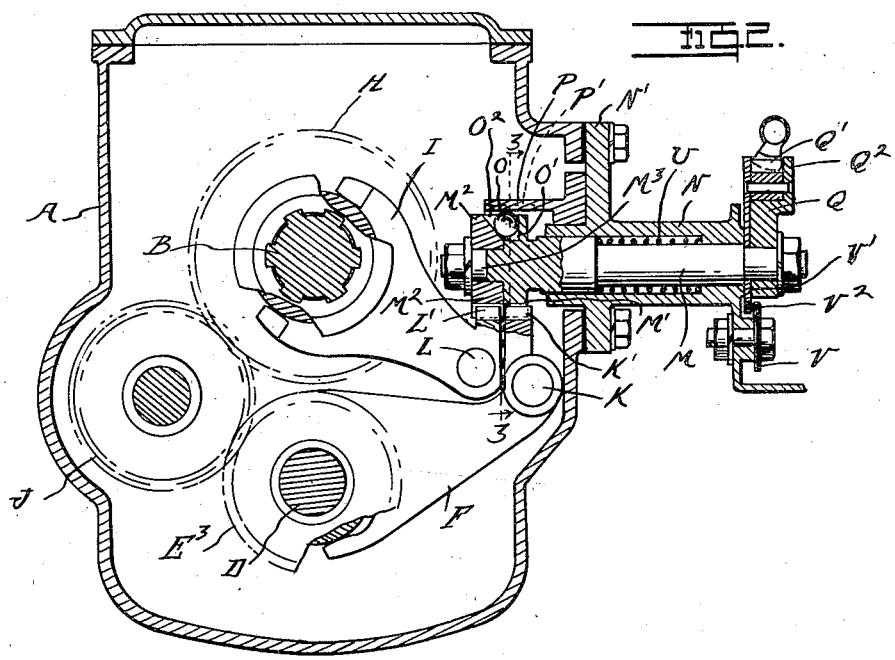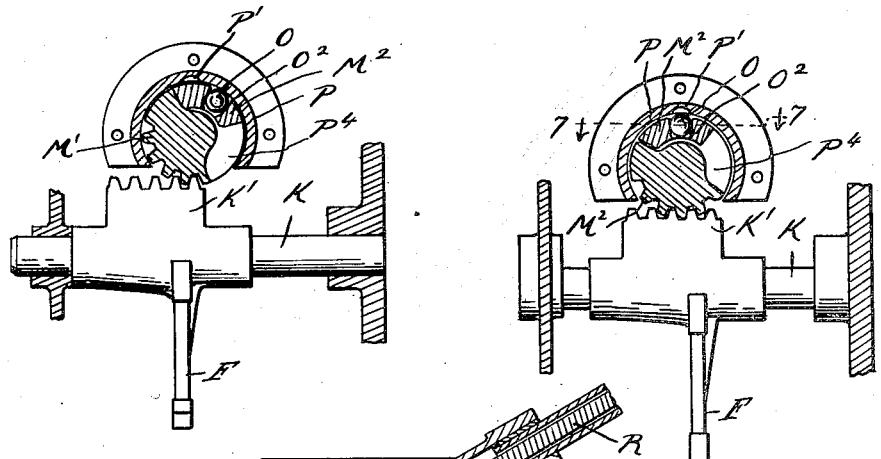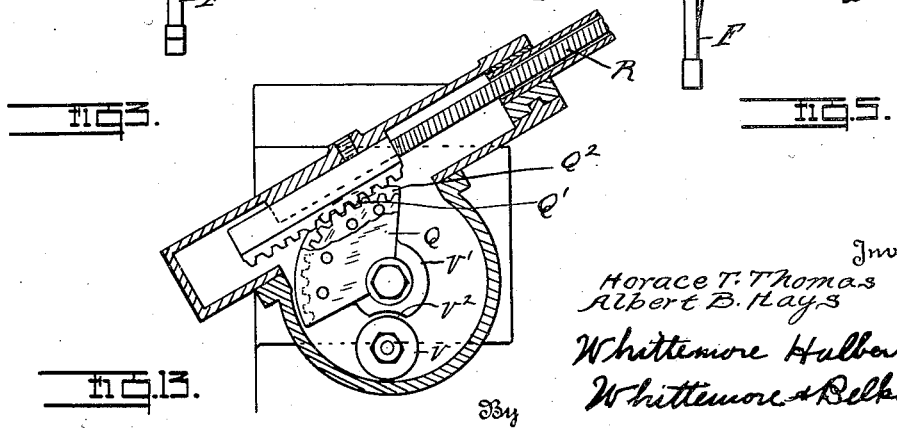

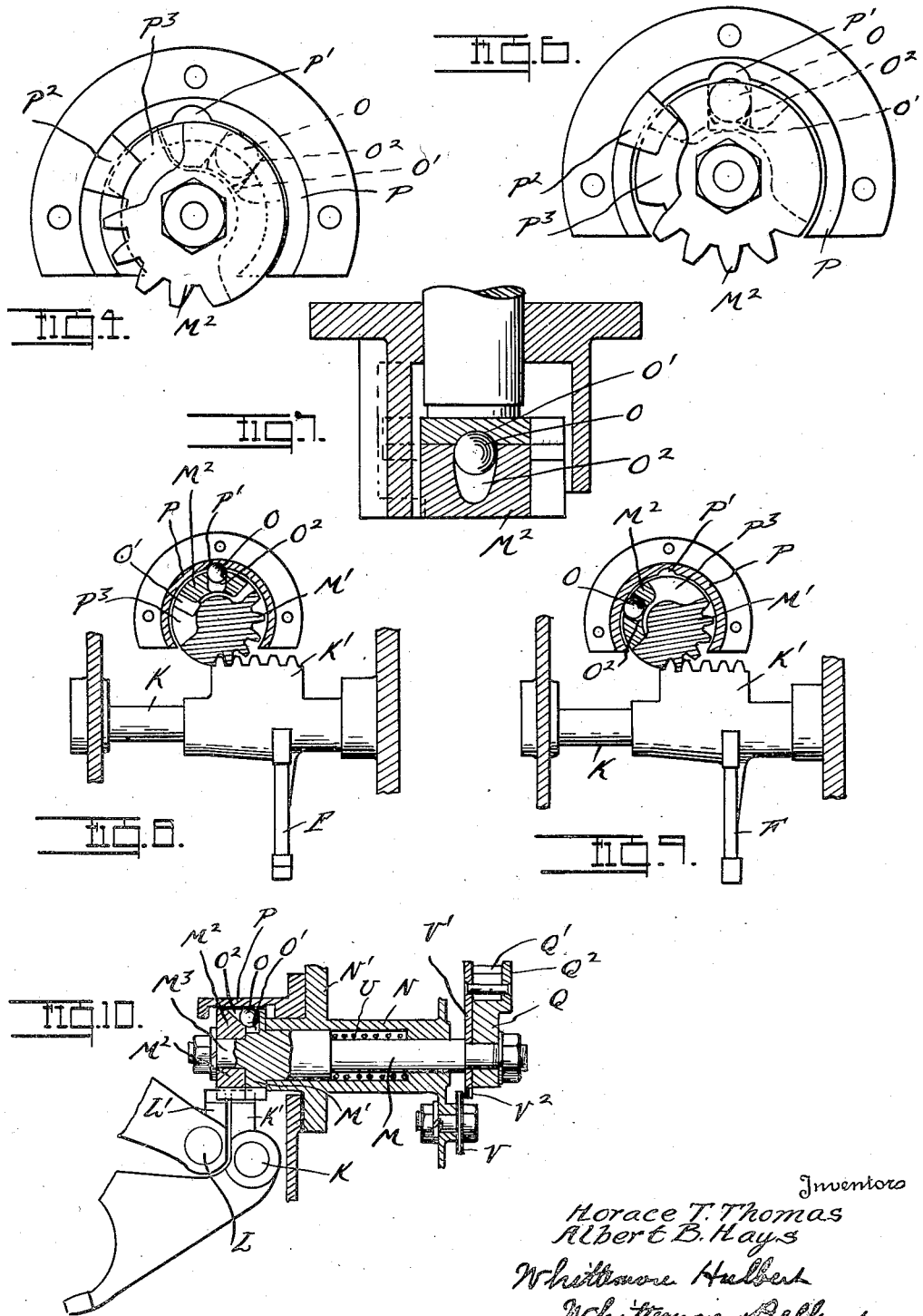

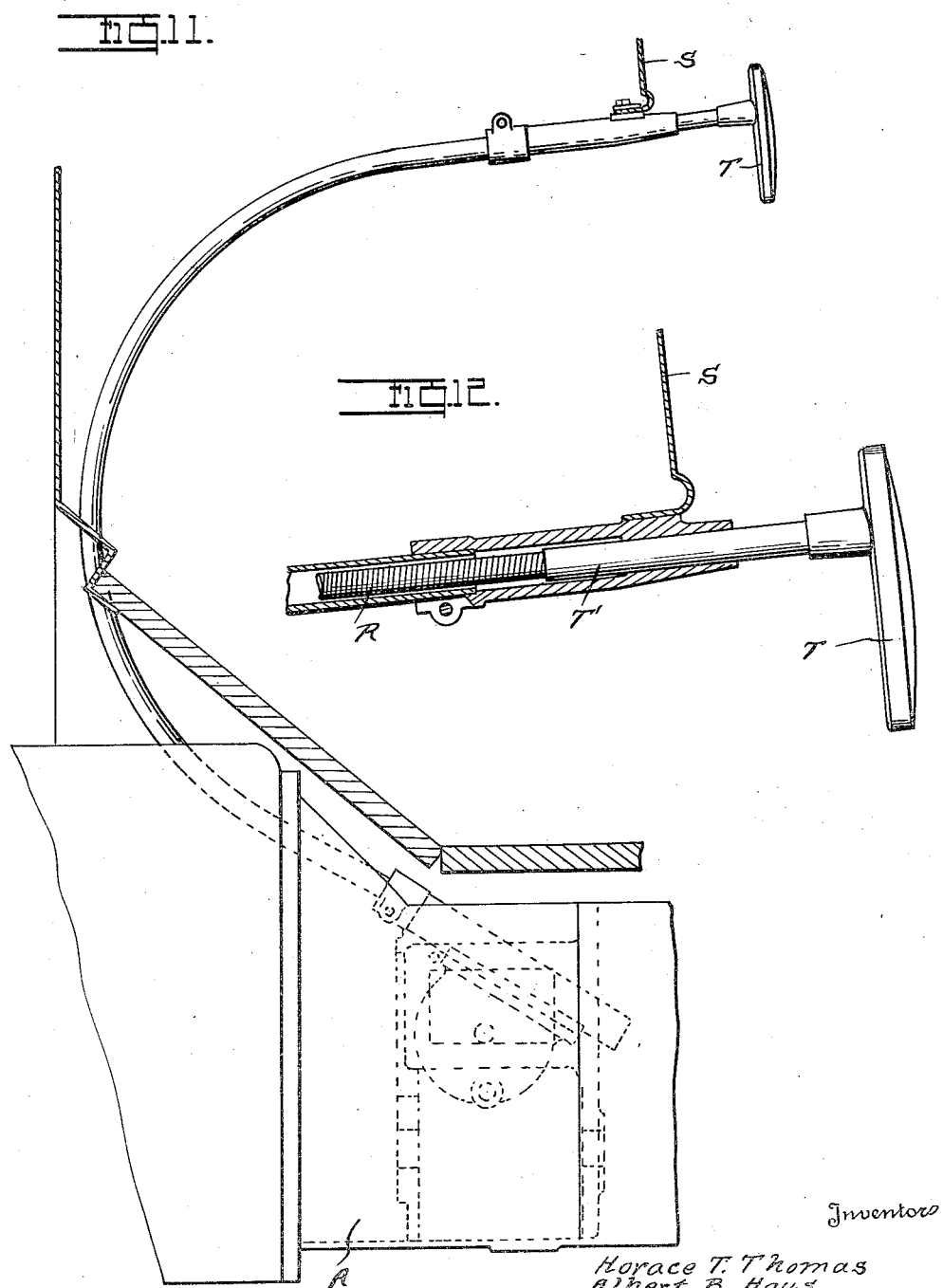

Patented Feb. 13, 1934

1,947,235

UNITED STATES PATENT OFFICE 1,947,235

TRANSMISSION CONTROL MECHANISM FOR MOTOR VEHICLES

Horace T. Thomas and Albert B. Hays, Lansing, Mich.

Application December 27, 1932
Serial No. 649,102

12 Claims. (Cl. 74—39)

The invention relates to motor vehicle transmission control mechanisms of that type in which the manually operable member is indirectly connected to the gear shifting means. More particularly, the invention relates to constructions in which the manually operable member is mounted on the cowl and is connected to the gear shifters through the medium of a flexible shaft adjustable both axially and rotatively and extending through a circuitous path to the transmission so as to avoid interference with easy access to the forward seat.

Heretofore control mechanisms of this type have been devised for use in connection with standard transmission gearings having at least three forward speeds and a reverse. For such constructions it is desirable to have the manually operable member follow as closely as possible the movements of the control lever of a standard gear shift mechanism. Our improved construction is, however, primarily designed for use in connection with semi-automatic transmissions, where the forward speed will automatically vary within certain limits and is suitable for operation of the car, including starting, under ordinary conditions. It is therefore only necessary to operate the control for shifting the gears into reverse or for forward speeds under extra heavy loads, such as starting on an up-grade, climbing an abnormally steep hill or traveling on a soft road bed. To facilitate operation under conditions just described we have departed from the sequence of standard gear shift controls and have designed a construction in which movement of the control handle forward from its neutral position adjusts the transmission for all ordinary forward driving, while the other two adjustments are accomplished by drawing the handle rearward, one without turning and the other with a preliminary angular adjustment. Preferably the rearward movement of the handle without turning adjusts the gearing for low speed forward driving, while the combined turning and rearward movement is used for reverse. This preferable construction is herein specifically illustrated and described but it is obvious that if desired, a direct rearward movement might be used for reverse and the combined movement for low speed forward.

The specific construction of the transmission mechanism forms no part of the present invention but the type of semi-automatic transmission to which our improved control is applied requires a different operation of the shifters from that in ordinary transmissions. This in turn necessitates a difference in construction of the control means as hereinafter set forth.

In the drawings:

Fig. 2 is a cross section through the transmission mechanism and the control mechanism attached thereto;

Fig. 3 is a cross section on line 3—3 of Fig. 2;

Fig. 4 is an elevation of some of the parts in Fig. 3 viewed in the same direction;

Figs. 5 and 6 are similar to Figs. 3 and 4 showing an adjustment into neutral;

Fig. 7 is a section on line 7—7 of Fig. 5;

Figs. 8 and 9 are views similar to Fig. 3 showing adjustments respectively for low speed and reverse;

Fig. 10 is a view similar to a portion of Fig. 2 with the parts adjusted for reverse.

Fig. 11 is an elevation showing the control mechanism as applied to a motor vehicle;

Fig. 12 is a section through a portion of Fig. 11;

Fig. 13 is a sectional view showing the connection between the flexible shaft and the gear segment actuated thereby.

Figures 1, 1B:
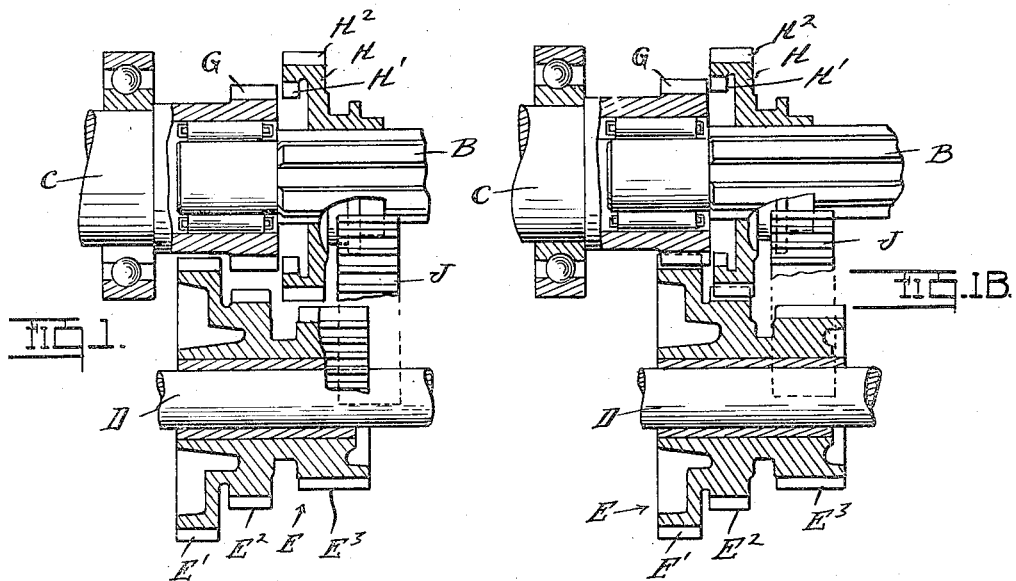
Figures 1, 1A, 1B and 1C are diagrammatic views illustrating the shiftable gears of the transmission respectively in neutral and three positions of adjustment therefrom.

As shown in Fig. 2, A is the housing of the transmission, B is the driven spline shaft therein, C is the aligned driving shaft, D is a counter shaft, E is a gear cluster on the counter shaft movable thereon by a shifter fork F, G is a pinion on the driving shaft and H a shiftable gear on the spline shaft actuated by the shifter fork I and having the internal gear H' for clutch engagement with the pinon G and the external gear H² for engagement with a gear E² of the cluster E in a certain position of adjustment. The gear E' of the cluster is also adapted in one position of adjustment to intermesh with the pinion G and the gear E³ of the cluster is in mesh with a reversing gear J which is also in mesh with the gear wheel H² in one position of adjustment thereof. Thus by shifting the gear H forward on the spline shaft to engage the internal gear H' with the pinion G, the shafts B and C are directly clutched to each other. By shifting the gear H rearward to disengage the clutch, the gearing will be in neutral. By shifting the cluster E rearward when the gear H is in the neutral position, the gears E' and E² will respectively intermesh with the pinion G and the gear H² to produce low speed forward and finally the shifting of the gear H farther rearward will engage the same with the reverse gear J which is also in mesh with the gear $E^3$, thereby driving the shaft C in reverse direction.

The control mechanism for effecting these various movements is constructed as follows: K and L are parallel guide rods on which the shifter forks F and I are respectively mounted. K' and L' are racks on the forks F and I which are arranged parallel and in close proximity to each other. M is a shaft journaled and longitudinally slidable in a bearing N preferably on a plate N' detachably secured to the housing A. At the inner end of this shaft, preferably integral therewith, is a gear segment M' which is in mesh with the rack K'. Adjacent to this gear segment is a second gear segment $M^2$ in mesh with the rack L' and which is rotatively mounted on a cylindrical extension $M^3$ of the shaft. The segments M' and $M^2$ are, however, normally locked to each other by a ball O which engages a radially extending recess O' in the segment M' and also a recess $O^2$ in the segment $M^2$. The ball is held in engagement with these recesses by a segmental flange P partially surrounding the segments M' and $M^2$ and thus during certain rotary movements of the shaft M and gear segment $M^2$ will rotate therewith.

At the outer end of the shaft M beyond the bearing N is attached a gear segment Q which is engaged by a rockable and longitudinally movable rack Q' held in engagement with said segment by side flanges $Q^2$. This rack Q' is connected to a flexible shaft R which extends through a circuitous path around the floor boards and dash to the cowl S where it is connected to the shank T' of the operating handle T. The arrangement is such that a movement of the operating handle T axially of its shank T' will impart a similar longitudinal movement to the flexible shaft R and rockable rack Q' which in turn will rotate the gear segment Q and shaft M. On the other hand, a rotation of the handle T will communicate through the shaft R a rocking movement to the rack Q' which will adjust the same and the shaft M axially of the latter.

To effect the several adjustments of the transmission gearing previously described, the gear segment $M^2$ must rotate with the gear segment M' for certain adjustments and must remain stationary for other adjustments. The first is accomplished through the medium of the ball O which couples the gear segment $M^2$ with the gear segment M', but the second requires the release of this coupling engagement and the holding of the segment $M^2$ from movement during the continued rotation of the shaft M and segment M'. This is effected by providing in the segmental flange P a groove P' of sufficient depth so that when the recesses O' and $O^2$ are in registration therewith, the ball O under the torque of the segment M' will be forced out of the recess O' and into the recess $O^2$ and groove P'. To insure this movement the bottom of the recess $O^2$ is oblique so that the ball O will be forced upward into the groove P' and movement of the segment $M^2$ is arrested by a stop formed by a lug $P^2$ projecting radially inward from the end of the segmental flange P. This lug normally engages a cut-away portion $P^3$ in the gear segment $M^2$ which is of sufficient length to permit angular movement of the segment $M^2$, while the internal gear H' is moved into or out of clutching engagement with the gear G. Any further angular movement of the shaft M will engage the segment $M^2$ with the stop $P^2$ holding said segment from movement whereupon the continued movement of the segment M' will force the ball O out of engagement with the recess O'. The groove P' is located to engage the ball in the neutral position of the gear shift and thus while in this position the shaft M may be moved axially without disengaging the ball from said groove. Such axial movement may be effected by the rocking of the rack Q' which in turn is effected by a rotation of the handle T through the medium of the shaft R. The axial movement of the shaft M will carry the gear segment $M^2$ out of the path of the stop lug $P^2$ and will also engage the teeth of the segment with both of the racks K' and L'. Thus any further rotation of the shaft M while in this position of axial adjustment will cause the simultaneous movement of both of the gear segments M' and $M^2$ and the racks K' and L', thereby moving both of the shifter forks F and I.

Figures 1A, 1C:
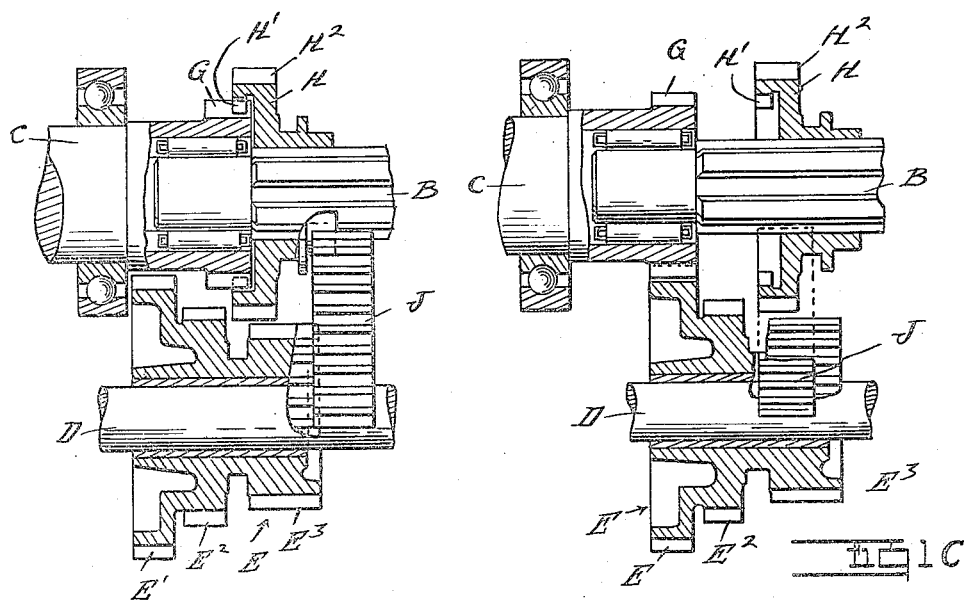

With the construction as above described, the operation is as follows: Assuming that the handle T is in neutral position, the gear segments M' and $M^2$ will be in the relative position illustrated in Fig. 5 and the driving shaft C will be rotatively free from the driven shaft B. To adjust from this position into high speed forward position, the handle T is moved forward axially of its shank T'. This through the flexible shaft R will impart an axial movement to the rockable rack Q' which by rotating the gear segment Q, shaft M and gear segments M' and $M^2$ will adjust the latter into the position shown in Fig. 3. At the beginning of this movement the ball O is carried laterally out of the groove P' and the segmental flange P will therefore force the ball into locking engagement with the recesses O', $O^2$, coupling the gear segments M' and $M^2$ together and compelling both to rotate with the shaft M. This movement adjusts the gear H forward on the shaft B and clutches the internal gear H' with the gear G on the shaft C, as shown in Fig. 1A.

To adjust from the neutral position shown in Fig. 5 to low speed forward shown in Fig. 8, the control handle T is moved rearward axially of its shank T' which through the flexible shaft R and rockable rack Q' will impart a movement in the reverse direction to the gear segment Q, shaft M and gear segment M'. This movement will not, however, impart movement to the gear segment $M^2$, inasmuch as the lug $P^2$ will obstruct movement of the same while the initial movement of the gear segment M' will force the ball O out of engagement with the recess O' into the recess $O^2$ and groove P'. This will lock the gear segment $M^2$ from any movement but the cut-away portion $P^4$ in the gear segment M' will permit movement of the latter without interference from the locked gear segment $M^2$. This adjustment places the gears in low as shown in Fig. 1B.

To adjust the transmission for reverse the handle T is moved from any position in which it is standing first into neutral, then rotated and drawn further rearward. The rotation of the handle will transmit a similar rotation to the rockable rack Q' through the medium of the shaft R which will move the gear segment Q and shaft M axially of the latter. This will withdraw the gear segment $M^2$ out of the path of the stop lug $P^2$ and will also move the teeth of the gear segment $M^2$ so as to bridge between the teeth of the racks K' and L'. In this position a rearward movement of the handle T will cause a rotation of the shaft M, both gear segments M', $M^2$, moving longitudinally both racks K' and L' into the position shown in Fig. 9. This adjusts the transmission to the position illustrated in Fig. 1C.

The shaft M is normally held in the position of axial adjustment shown in Fig. 2 by the tension of a spring U engaging a shoulder on said shaft and arranged in a recess in the bearing N. This spring holds the shaft normally in such position but when the gearing is shifted into reverse the rockable rack Q' will move the shaft outward against the tension of the spring. Below the gear segment Q there is mounted upon the casing a disk V which is on one side of a segmental flange V' on the gear segment Q. This flange V' has a notch V² thereon at one point which permits the outward movement of the shaft M and during the subsequent rocking movement of said shaft the disk V and flange V' in cooperation will hold the shaft in this axial position.

What we claim as our invention is:

1. In a gear shifting mechanism, the combination of a rock shaft, a mounting for said rock shaft permitting axial and rocking movements thereof, a gear segment on said rock shaft, a rack bar longitudinally and rockably supported on said mounting and engaging said gear segment to actuate the same rotatively by its longitudinal movement and axially by its rocking movement, a gear shifter selected by the axial movement of said rock shaft and actuated by the rotative movement thereof, an operating handle at a remote point and a flexible shaft connecting said operating handle and said rack bar.

2. In a gear shifting mechanism the combination of a rock shaft, a mounting for said rock shaft permitting axial and rockable movements thereof, a gear segment on said rock shaft, a rack bar longitudinally and rockably supported on said mounting and engaging said gear segment to actuate the same rotatively by its longitudinal movement and axially by its rocking movement, a plurality of gear shifters, means on said rock shaft for selectively engaging said shifters upon the axial movement of said shaft, and for actuating the engaged shifter on the rocking movement of the shaft, a manually operable member at a remote point and a flexible shaft connecting said manually operable member with said rack bar.

3. In a gear shifting mechanism the combination of a rock shaft, a mounting for said rock shaft permitting axial and rockable movements thereof, a gear segment on said rock shaft, a rack bar longitudinally and rockably supported on said mounting and engaging said gear segment to actuate the same rotatively by its longitudnial movement and axially by its rocking movement, manually operable means for operating said rack bar longitudinally and rotatively, a plurality of gear shifters each provided with a rack bar, and a gear segment on said shaft alternatively engageable with said rack bars by the axial movement of said shaft and actuating the rack bar with which it is engaged upon rotation of said shaft.

4. In a gear shifting mechanism the combination of a rock shaft, a mounting for said rock shaft permitting axial and rockable movements thereof, a gear segment on said rock shaft, a rack bar longitudinally and rockably supported on said mounting and engaging said gear segment to actuate the same rotatively by its longitudinal movement and axially by its rocking movement, manually operable means for operating said rack bar longitudinally and rotatively, a plurality of gear shifters each provided with a rack bar, and a gear segment on said shaft engaging one of said rack bars in one position of axial adjustment of said shaft and simultaneously engaging both of said rack bars in another position of axial adjustment of said shaft.

5. In a gear shifting mechanism the combination of a rock shaft, a mounting for said rock shaft permitting axial and rockable movements thereof, a gear segment on said rock shaft, a rack bar longitudinally and rockably supported on said mounting and engaging said gear segment to actuate the same rotatively by its longitudinal movement and axially by its rocking movement, manually operable means for operating said rack bar longitudinally and rotatively, a plurality of gear shifters each provided with a rack bar, a gear segment on said shaft engageable with one of said rack bars, an adjacent gear segment rotatively mounted on said shaft and engaging the other of said rack bars, means operable in one position of axial adjustment of said shaft for coupling said gear segments to each other during angular movement on one side of neutral and for uncoupling and locking the rotatively mounted segment during angular movement on the opposite side of neutral and means operable in another position of axial adjustment of said shaft, for locking said gear segments to each other during the entire angular movement on both sides of neutral.

6. In a gear shifting mechanism the combination of a plurality of gear shifters, manually operable means for selecting and for actuating said gear shifters, means operable in one selecting position for simultaneously operating both of said shifters throughout the entire range of movement thereof and means operable in another selecting position for operating both of said shifters for a portion of the shifting movement and one only of said shifters during another portion of the movement.

7. In a gear shifting mechanism, the combination of a plurality of gear shifters, manually operable means for selecting and for actuating said gear shifters, means operable in one selecting position for simultaneously operating both of said shifters throughout the entire range of movement thereof and means operable in another selecting position for operating both of said shifters for a portion of the shifting movement and one only of said shifters during another portion of the movement, and locking means for the unoperated shifter.

8. In a gear shifting mechanism the combination of a plurality of gear shifters, manually operable means for selecting and for actuating said gear shifters by relative transverse movements and upon opposite sides of a neutral position, means operable in one selecting position for simultaneously actuating both of said shifters on one side of neutral and one only of said shifters on the opposite side of neutral, means for locking the unoperated shifter at neutral, and means operable in a different shifting position for simultaneously actuating both of said shifters on both sides of neutral.

9. In a gear shifting mechanism, the combination of a rock shaft, a mounting for said rock shaft permitting axial and rockable movements thereof, a gear segment on said rock shaft, a rack bar longitudinally and rockably supported on said mounting and engaging said gear segment to actuate the same rotatively by its longitudinal movement and axially by its rocking movement, manually operable means for operating said rack bar longitudinally and rotatively a plurality of gear shifters, means on said rock shaft for selectively engaging said shifters upon the axial movement of said shaft and for actuating the engaged shifter on the rocking movement of the shaft, means operable in one selecting position for disengaging and locking one of said shifters during a portion of the shifting movement and means operable in another shifting position for maintaining engagement with said shifters during the entire shifting movement.

10. In a gear shifting mechanism the combination of a rock shaft, a mounting for said rock shaft permitting axial and rockable movements thereof, a manually operable member for operating said shaft axially and rockably, a plurality of shifters each provided with a rack bar, a gear segment fixed on said rock shaft and in engagement with one of said rack bars, an adjacent gear segment rotatively mounted on said rock shaft and in engagement with the other of said rack bars, a ball engaging recesses in adjacent faces of said gear segments to couple the same, a member for holding said ball in engagement with said recesses during a portion of the rocking movement of said shaft, said member having a recess therein registrable with said ball in one position of said rocking movement to permit disengagement of said ball from the recess in said fixed segment to uncouple the rotatively mounted segment therefrom and to lock the latter during another portion of the locking movement of said shaft.

11. In a gear shifting mechanism, the combination of a rock shaft, a mounting for said rock shaft permitting axial and rockable movements thereof, a manually operable member for actuating said rock shaft axially and rockably, a plurality of gear shifters each provided with a rack bar, a gear segment fixed on said shaft engaging one of said racks, an adjacent gear segment rotatively mounted on said shaft and engaging the other of said racks, a ball engaging recesses in the adjacent faces of said segments to couple the same, a stationary segmental flange for retaining said ball in engagement with said recesses during a portion of the rocking movement of said shaft in one position of axial adjustment thereof, said segmental flange having a recess registering with said ball in one position of the rocking movement of the shaft, to permit disengagement from said fixed segment and to lock said rotatably mounted segment from further rocking movement with the shaft, said segmental flange holding said ball in coupling engagement with said segments during the entire rocking movement of said shaft when the latter is in another position of axial adjustment.

12. In a gear shifting mechanism, the combination with a housing for a transmission mechanism and a plurality of gear shifters therein, each provided with a rack bar, of a detachable cover plate for said housing provided with a journal bearing, a rock shaft mounted in said journal bearing and movable axially and rotatively therein, a gear segment at the outer end of said bearing, a rack bar engaging said gear segment, a bearing on said cover plate for said rack bar permitting a longitudinal and rocking movement thereof, flanges on said gear segment engaging said rack bar to move said shaft axially on the rocking of said rack, a gear segment fixed on said shaft within said housing engaging one of said gear shifter rack bars, an adjacent gear segment rotatively mounted on said shaft and engaging the other of said gear shifter rack bars, a ball engaging recesses in the adjacent faces of said gear segments to couple the same, and a segmental flange on said housing for retaining said ball in engagement with said recesses during a portion of the rocking movement of said shaft when in one position of axial adjustment and during the entire rocking movement of said shaft while in another position of axial adjustment, said flange having a recess registering with said ball at a point in the rocking movement of said shaft in the first of said axial positions to release the coupling engagement of said ball and to lock the rotatively mounted segment during the further rocking movement of the shaft.

HORACE T. THOMAS.
ALBERT B. HAYS.